Dec. 25, 1945. J. W. SIMMONS 2,391,650
RESILIENT FASTENER
Filed April 22, 1943 3 Sheets-Sheet 1

INVENTOR.
John W. Simmons
BY
Hull & West
ATTORNEYS.

Dec. 25, 1945.    J. W. SIMMONS    2,391,650
RESILIENT FASTENER
Filed April 22, 1943    3 Sheets-Sheet 2

INVENTOR.
John W. Simmons
BY
Hull & West
ATTORNEYS

Dec. 25, 1945.  J. W. SIMMONS  2,391,650
RESILIENT FASTENER
Filed April 22, 1943  3 Sheets-Sheet 3

INVENTOR,
BY John W. Simmons
Hull H. West
ATTORNEYS.

Patented Dec. 25, 1945

2,391,650

UNITED STATES PATENT OFFICE 2,391,650

RESILIENT FASTENER

John W. Simmons, Cleveland Heights, Ohio

Application April 22, 1943, Serial No. 484,022

10 Claims. (Cl. 85—36)

This invention relates to resilient or quick acting fasteners, and it has to do more particularly with a device of this character wherein the gripping parts consist of opposed wire jaws, similar in this respect to the type of fastener disclosed and claimed in my copending application Serial No. 435,215, filed March 18, 1942, which matured into Letters Patent No. 2,328,587, dated September 7, 1943.

An important object of my present invention is to increase the gripping action of a fastener of the above mentioned type, and this result I accomplish by providing means desirably in the nature of cams for urging the wire jaws into firmer contact with the threaded or indented entering element as the jaws are forced to final position either by the turning of a threaded element or by the compression of the fastener axially of the element.

Another object is to provide a fastener of the aforesaid type that will not become loose from vibration, and this end is promoted by serrating, notching or roughening the wire engaging surfaces of the means in the nature of cams above referred to, and/or by the inclusion of tongues or parts of fibre or other similar non-metallic material in addition to the wire jaws for holding engagement with the entering element.

Another object of the invention is to provide an efficient, simple and relatively inexpensive construction for a fastener of the above described character including a sheet metal base member and wire means attached thereto for holding engagement with the entering element and wherein parts integral with the base member may constitute the aforesaid cam means, and other parts integral with said member may provide the medium by which the wire means is attached to the base member; and a further object is to so construct and connect the base member and wire means that, as the element engaging parts of said wire means yield in a lateral direction in their coaction with the entering element they will be permitted to shift or creep endwise with respect to the base member.

A still further object of the invention is the provision of a multiple or so-called "gang" fastener embodying my improvements that is especially convenient of use, is simple and inexpensive, very efficient, and lends itself readily to prevailing production methods.

Figure 1:
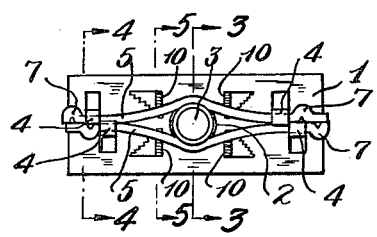
Figure 7:
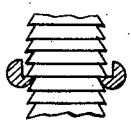
Figure 20:
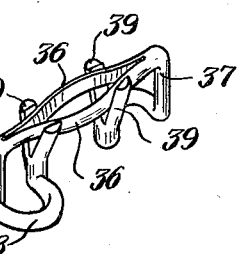
Figure 2:
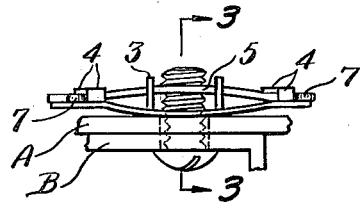
Figure 8:
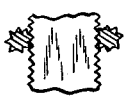
Figure 19:
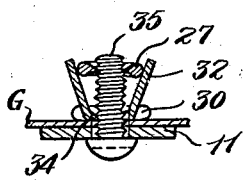
Figure 3:
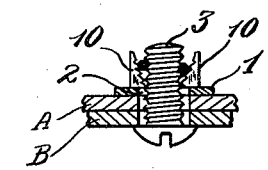
Figure 14:
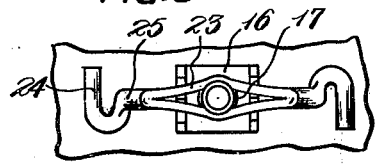
Figure 4:
Figure 15:
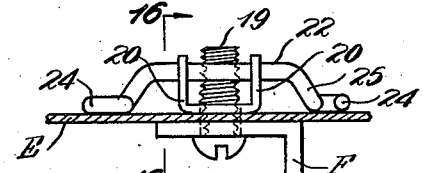
Figure 16:
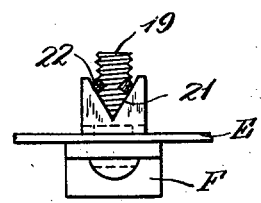
Figure 5:
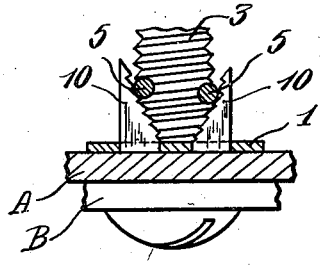
Figure 17:
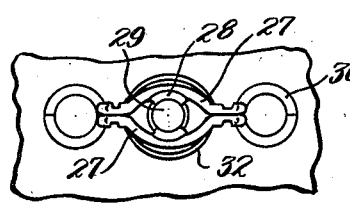
Figure 6:
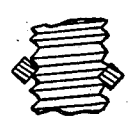
Figure 18:
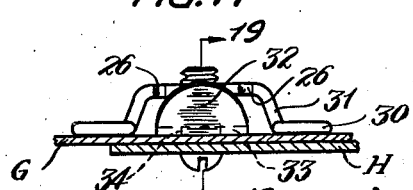
Figure 9:
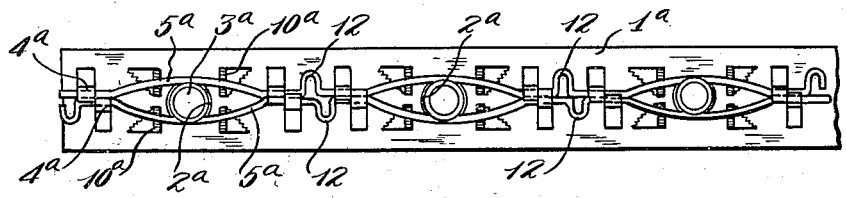
Figure 13:
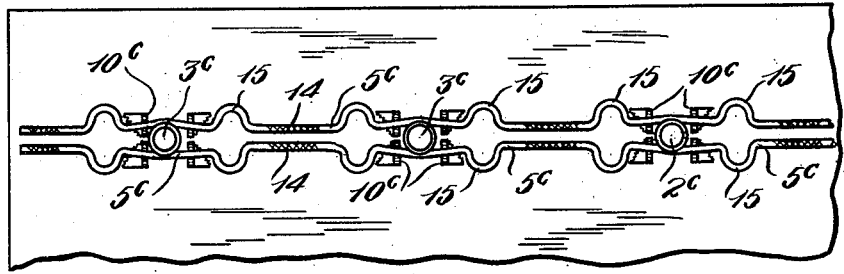
Figure 21:
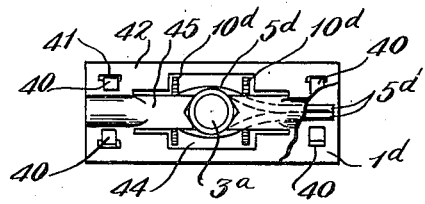
Figure 23:
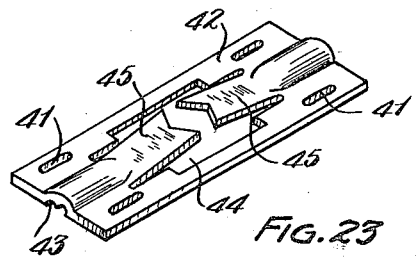
Figure 22:
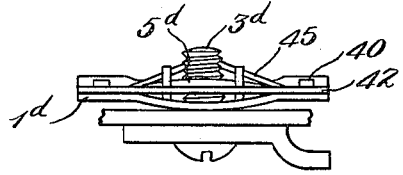
Figure 24:
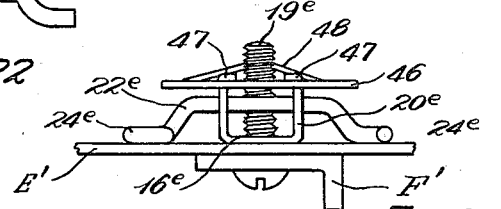
Figure 25:
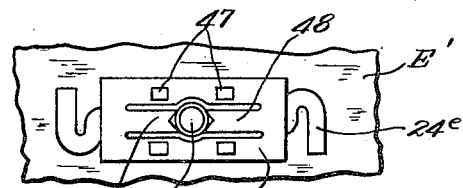
Figure 26:
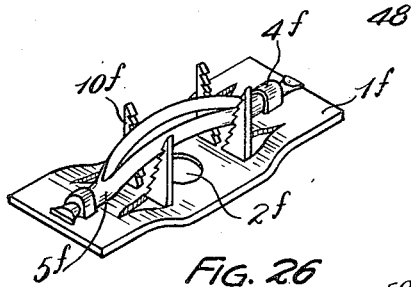
Figure 27:
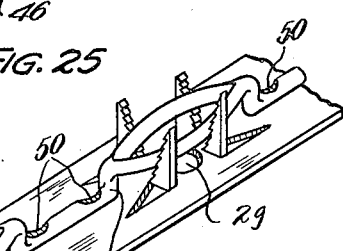

The objects and advantages above enumerated, with others to appear as this description proceeds, are attained in the embodiments of the invention illustrated in the accompanying drawings wherein Fig. 1 is a plan view of one form of my improved resilient fastener; Fig. 2 shows the fastener of Fig. 1 in side elevation, the view including fragments of parts that are connected together by the entering element or screw to which the fastener is applied; Fig. 3 is a transverse section on the lines 3—3 of Figs. 1 and 2; Figs. 4 and 5 are sectional details drawn to a scale considerably enlarged over that of the preceding views, the sections being taken on the respective lines 4—4 and 5—5 of Fig. 1; Fig. 6 is a detail showing jaws that are made of wires that are square in cross section; Figs. 7 and 8 show entering elements having, respectively, annular grooves in lieu of threads, and indentations on opposite sides, and wherewith wires of different cross sectional shapes are associated; Fig. 9 is a plan view, and Fig. 10 a side view, of a multiple or gang fastener; Fig. 11 is a fragmentary elevational view of a gang fastener wherein the base member is formed by a wall section or panel and wherein the wires are attached to the base member by lugs that are struck from said member; Fig. 12 is a section on the line 12—12 of Fig. 11 and shows the parts that are connected together by the screw wherewith the fastener cooperates; Fig. 13 is a view similar to Fig. 11 showing a gang fastener wherein the wires are welded to the base member; Fig. 14 is a plan view of a fastener including a split wire modification of the invention that constitutes the subject matter of my aforesaid application and wherewith is combined a member incorporating the cam means of the present invention; Fig. 15 is a side elevation of the fastener shown in Fig. 14 and including the parts that are connected together by the entering element or screw; Fig. 16 is a section on the line 16—16 of Fig. 15; Fig. 17 shows a wire fastener of a kind disclosed in my former application and wherewith is associated another form of the cam means of the present invention; Fig. 18 is a side elevation of the parts shown in Fig. 17; Fig. 19 is a section on the line 19—19 of Fig. 18; Fig. 20 is a perspective view of a split-wire modification of the invention; Fig. 21 is a plan view of a fastener like that shown in Fig. 1 in which is incorporated a member of fibre or other similar non-metallic material including opposed tongues arranged for clamping engagement with the entering element or screw; Fig. 22 is a side elevation of the fastener shown in Fig. 21; Fig. 23 is a perspective view of the member of fibre or the like; Fig. 24 is a side elevation of the combination shown in Figs. 14 to 16 and to which is added a member of fibre or the like having tongues that grip the entering element or screw; Fig. 25 is a plan view of the parts shown in Fig. 23; Fig. 26 is a perspective view of a fastener, similar to that shown in Figs. 1 to 5, but incorporating a single wire that is split lengthwise intermediate its ends to provide resilient jaws, and Fig. 27 is a fragmentary perspective view of a gang or multiple fastener incorporating the split wire feature.

The form of the invention illustrated in Figs. 1 to 5 includes a base member 1 that consists of a rectangular piece of sheet metal provided with a central aperture 2 through which an entering element or screw 3 is adapted to be projected. Struck from the base member, adjacent the ends thereof, are lugs 4 that are curled inwardly and over the adjacent portions of wire 5 of approximately the same length as the base member 1. The lugs 4 yieldingly hold the wires so that they are capable of shifting slightly in the direction of their length with respect to the base member, the wires being shown as having lateral projections 7 that prevent the withdrawal of the wires from the lugs. The projections 7 may be formed by kinking the wires or by pinching or swaging them in a common and well known manner. Intermediate their regions of connection with the base member, the wires 5 are spaced a substantial distance from the base member and, also, from each other on opposite sides of the axis of the aperture 2, so that the entering element or screw 3, when projected through said aperture, may be forced between the jaws constituted of the adjacent portions of the wires. The spacing of the wire jaws from the plane of the base member may be accomplished by arching the wires upwardly from the base member or by bowing the base member away from the wires, or both, the latter being the arrangement illustrated in Fig. 2. Rising from the base member on opposite sides of its longitudinal axis and in positions to be engaged by the wire jaws, are cam means 10, shown in the present instance as triangular lugs that are struck from the piece of metal that constitutes the base member and bent at right angles thereto. The jaw engaging surfaces of said cam means may be smooth, as indicated in some views of the drawing, or they may be serrated or otherwise treated or formed to minimize or prevent accidental slippage between the jaws and cam means. For illustrative purposes in some of the views the cam surfaces of the parts in question are formed with barbs or teeth, as best illustrated in Fig. 5.

In the use of the above described fastener, the entering element or screw 3 is projected through registering holes in the parts A and B that are to be connected together, and the fastener is then applied by engaging it over the entering element, as in the position shown in Fig. 2. Where the fastener is incorporated in a structure, such as a refrigerator cabinet, for example, the fastener is pushed through the aperture from the near side of the wall section or panel and automatically enters between the jaws on the reverse side. Entering elements or screws of different sizes or diameters, and having threads of different pitch, within a practical range, may be used with a given size fastener, the relation of the diameter or thickness of the entering element to the spacing of the jaws in all cases being such as will cause the jaws to spread beyond their normal relaxed condition and, through their inherent resiliency, grasp the entering element securely. In the case of a screw, the jaws readily adjust themselves to the pitch or angle of the thread, and when the screw is turned in an appropriate direction the jaws are fed by the threads of the screw toward the base member and along the cam surfaces of the cam means 10. Said means will urge the jaws into firmer contact with the entering element as they move toward the base member, as will be readily understood.

In lieu of a screw, an entering element may be employed having annular grooves instead of threads, as in Fig. 7, or the entering element may be provided on its opposite sides with indentations for the reception of the jaws, such as that illustrated in Fig. 8. Instead of turning the threaded entering element or screw for the purpose of tightening the fastener, the fastener may be compressed axially of the entering element. Such a method as that last mentioned for tightening the fastener is necessary with the kinds of entering elements illustrated in Figs. 7 and 8. As the fastener is placed under compression and the wires whereof the jaws are formed tend to straighten, their end portions may slide through the lugs 4.

Figure 10:
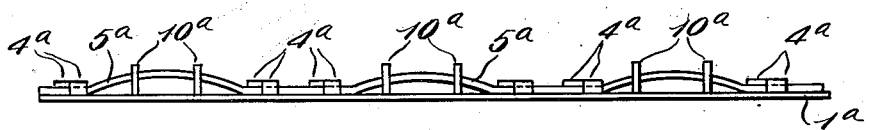
Figures 11, 12:
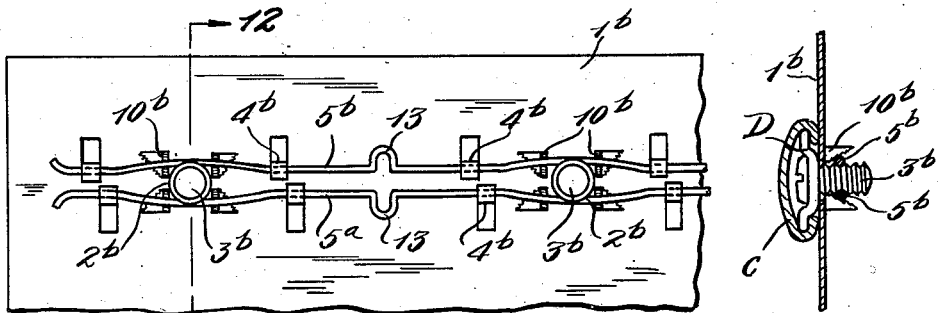

In the gang fastener illustrated in Figs. 9 and 10, continuous wires 5$^a$ are yieldingly attached to an elongated base member 1$^a$ by lugs 4$^a$, and the portions of the wires constituting the jaws of the fastener are disposed on opposite sides of the axes of apertures 2$^a$ through which the entering elements or screws are adapted to be projected. Cam means for urging the jaws into firmer contact with the entering elements as the jaws are forced toward final position, are designated 10$^a$. The wires are offset or kinked at 12, intermediate adjacent pairs of jaws, so that the portions of the wires including the jaws may shift or creep slightly within the lugs 4$^a$ to permit elongation as the jaws tend to straighten.

In the gang nut construction just described, the base 1$^a$ is shown as flat, while the jaw forming portions of the wires are arched away from the base member axially of the apertures 2$^a$. Fasteners of the gang construction just described may be made by suitable equipment, in long strips and then cut into individual fasteners, or into multiple fasteners of any desirable number of units. Of course, for special purposes, gang fasteners of the above character may be made with any desired spacing and arrangement of the apertures 2$^a$.

In Figs. 11 and 12 is illustrated a gang fastener wherein the base member 1$^b$ may consist of a wall section or panel of a radio or stove structure, a refrigerator cabinet, automobile body panel or fender, or the like; and the wires 5$^b$ are attached to the base member by lugs 4$^b$, as in the foregoing modifications, and shifting of the wires in the direction of their length with respect to the base member, for the purpose aforesaid, is permitted by the offset portions or kinks 13. The base member is provided with apertures 2$^b$, in proper relation to the portions of the wires 5$^b$ that constitute the pairs of opposed jaws, and arranged for cooperation with the jaws are the cam means 10$^b$. The parts forming said cam means are struck from the base member, as are also the lugs 4$^b$. In the sectional detail of the present construction, shown in Fig. 12, a molding C, used as a trim or decoration for the wall section, panel or fender that constitutes the base member 1$^b$, is attached to the base member by clips D that are fastened to said member by a suitable number of entering elements or screws 3$^b$ that are held in place by the jaws constituted of portions of the wires 5$^b$.

The construction just described may serve as an example of a situation where the fastening means is concealed and may be inaccessible to, or out of reach of, a workman engaged in inserting the entering elements through the apertures in the wall section or panel.

In a construction somewhat similar to that last described, and which is shown in elevation in Fig. 13, the wires 5$^c$ are secured to a base member 1$^c$ by welding, as indicated at 14. In this case each wire is offset or kinked, as shown at 15, or otherwise suitably deformed, between the welds and adjacent pairs of jaws. The apertures for the entering elements or screws are designated 2$^c$, and the portions of the wires that constitute the jaws, and are spaced apart on opposite sides of the axes of said apertures, are adapted to be urged toward each other by the cam means 10$^c$, shown as struck from the base member 1$^c$.

In Figs. 14 to 19 I have illustrated the cam means of my present invention combined with resilient fasteners that are disclosed in my above mentioned application; and according to Figs. 14 to 16 the cam means is embodied in a sheet metal unit including a base 16, provided with an aperture 17 for the passage of the entering element or screw 19, and whose end portions 20 are disposed at right angles to the base and are formed with V notches 21, as shown in Fig. 16, to provide opposed cam faces. The resilient fastener 22, wherewith I have here combined the cam means, is constructed of a piece of wire of suitable length that is split longitudinally throughout its middle portion to provide opposed jaws 23 that are connected to and spaced from bearing portions 24 by risers 25. The fastener, as here shown, is used in a connection between parts E and F, and through registering apertures of said parts, the entering element or screw 19 is projected. Loosely applied to the element or screw on the rear side of the part E is the cam means just described, the aperture 17 of which freely receives the entering element. The fastener 22 is then passed over said element until the bearing portions 24 contact the part E, after which the fastener is compressed axially of said element. When the pressure on the fastener is relaxed, the latter, due to its resiliency, will place the entering element under tension and bind the parts E and F firmly together. The pressure of the jaws upon the opposed sides of the entering element is increased through the action of the cam means, as will be readily understood, the jaws 23 coacting with the cam faces, as best illustrated in Fig. 16.

The resilient fastener shown in Figs. 17 to 19 is made of two identical reversely arranged wire elements that are welded together at 26. The portions of the elements between the welds constitute jaws 27 that are shown as having teeth 28 for contact with the entering element or screw 29. The jaws are connected to and spaced from the plane of bearing portions 30 by risers 31. In this case the cam means 32 is constructed of a sheet metal plate or washer whose opposite side portions or ends diverge with respect to each other from a central base 33 having an aperture 34 for the accommodation of the entering element or screw 35 through which parts G and H are connected together.

Fig. 20 is a perspective view of a form of the invention embodying some of the characteristics of that type of my earlier split wire fastener shown in Figs. 14 to 16 hereof. In the present case the wire is split lengthwise a suitable distance midway of its length and the portions on opposite sides of the split are spread apart to provide jaws 36 between which the entering element is adapted to be projected. Beyond the ends of the jaws the wire is turned downwardly to provide risers 37 that space the plane of the jaws from that of a base formed by curved portions 38. The wire is also bifurcated and formed at its ends to provide cam means consisting of branches 39 that diverge in a direction away from the base and are disposed on opposite sides of the jaws 36 for cooperation therewith.

To further increase the efficiency of my resilient fastener, I may include tongues of fibre or other tough but impressionable non-metallic material for clamping engagement with the entering element. In Figs. 21 and 22 I have shown this feature combined with the form of the fastener illustrated in Figs. 1 to 5 hereof. Lugs 40 are struck from the base member 1$^d$, near the corners thereof, and are projected through slots 41 in a rectangular member 42 of fibre or the like and are clinched over above said member to firmly bind it to the base member 1$^d$. The member 42 is formed on its underneath side adjacent its ends with channels 43 that receive the end portions of the wires 5$^d$ that form the jaws. The central region of the member 42 is cut away at 44 to accommodate the cam means 10$^d$, and extending inwardly from the end portions of said member are tongues 45 that are integral with the member and are deflected at a slight angle from the plane thereof toward their inner or free ends. Said ends may be straight, notched or otherwise formed for cooperation with the entering element 3$^d$. When the fastener is placed under compression, either by turning the entering element, if threaded, or by compressing the fastener axially of the entering element, the tongues 45 are drawn toward the plane of the member 42 and are thus placed under compression, the counterpart of the surface contour of the entering element being impressed into the tongues so as to enhance the holding action of the tongues upon the element. Under such action, the fastener is less likely to be shaken loose when subjected to vibration.

In Figs. 24 and 25 I have shown the last described feature combined with the cam means illustrated in Figs. 14 to 16 hereof. A member 46, consisting of a rectangular piece of fibre or the like, is connected, by lugs 47, to the ends 20$^e$ that extend from the base 16$^e$ of the cam means. Struck from the member 46 are tongues 48 whose inner ends are suitably shaped and arranged to engage the opposite sides of the entering element or screw 19$^e$. Under this arrangement the resilient fastener 22$^e$ is disposed between the member 46 and the base 16$^e$ of the cam means and with its bearing portions 24$^e$ engaged with the rear side of the part E' that is connected by the entering elements 19$^e$, to the part F'.

In the form of the invention illustrated in Fig. 26, parts 4$^f$ are struck from the base member 1$^f$ for the attachment to said member of a single wire 5$^f$ that is split lengthwise and spread intermediate its ends to provide a pair of jaws. Said jaws are spaced a substantial distance from the central portion of the base member and are arranged in axial alignment with the aperture 2$^f$. The cam means 10$^f$ are the same as in the first described form of the invention.

Fig. 27 shows a multiple or gang fastener wherein wire means 5$^g$ is secured to a strip-like base member 1$^g$, as by welding, as indicated at 50. The base member is provided with apertures 2ᵍ for the passage of entering elements, and said wire means is split lengthwise at intervals and spread so as to form a pair of jaws in axial alignment with each of said apertures. The portions of the wire means that form the jaws are spaced by risers 51, from the base portions of the wire means that are fastened to the base member, and said risers allow slight longitudinal movement of the jaws during compression thereof axially of the entering element. The jaws are urged inwardly as they are compressed by the opposed cam means 10ᵍ.

The term "detached" is used in some of the appended claims to distinguish the base member of my self-contained fastener from fasteners consisting only of resilient means that are permanently secured to walls, panels or other structural elements in a fixed position with respect to the holes in said elements through which screws, studs or similar entering elements are projected for holding engagement with the permanently attached fasteners.

Having thus described my invention, what I claim is:

1. A fastener of general utility comprising a detached sheet metal base member provided with an aperture, cam means rising from said member on opposite sides of its longitudinal axis, and resilient wires arranged upon the base member and attached thereto adjacent their ends, the intermediate portions of the wires constituting jaws disposed on opposite sides of the axis of the aperture in spaced relation to the base member and between said cam means for engagement therewith.

2. A fastener of general utility comprising a detached sheet metal base member provided with an aperture through which an entering element is adapted to be projected, resilient wires on the base member and attached thereto adjacent their ends, the intermediate portion of said wires constituting jaws that are disposed on opposite sides of the axis of the aperture and in spaced relation to the base member, and cam means consisting of lugs struck from the base member and having cam faces wherewith the jaws engage and whereby the jaws are urged into firmer contact with the entering element as the jaws are compressed axially of said element.

3. A fastener of general utility comprising, in combination, opposed resilient wire jaws secured together at their ends and between the portions of which intermediate their ends is adapted to be projected an entering element wherewith the jaws are arranged to cooperate, and cam means including a base and opposed cam faces that converge toward the base and between which the jaws are disposed and wherewith the jaws contact so that the jaws are urged into firmer engagement with the entering element as they are compressed axially of said element.

4. A fastener of general utility comprising a detached base member having an aperture, resilient wire means arranged upon the base member and attached thereto in regions spaced in opposite directions substantial distances from said aperture, portions of said means intermediate said regions constituting jaws that are disposed on opposite sides of the axis of said aperture and in spaced relation to the base member, cam means extending from the base member, and including cam faces that diverge in a direction away from said member on opposite sides of the jaws and wherewith the jaws engage so that the jaws are urged toward each other as they are compressed toward the base member, said jaws being capable of movement relative to the base member in the direction of their length.

5. A gang fastener comprising a base member provided with a series of apertures, a pair of continuous wires extending along said series and arranged side by side upon the base member and attached thereto in regions spaced in opposite directions from each aperture, portions of said wires intermediate said regions constituting jaws that are disposed on opposite sides of the axes of the apertures and in spaced relation to the base member, and cam means sustained by the base member and including cam faces that diverge in a direction away from the base member and between which the jaws are situated for engagement with said faces as they are moved toward the base member.

6. A fastener including resilient wire jaws between which is adapted to be projected an entering element, and cam means constructed of sheet metal and including a base and end portions disposed at substantially right angles to the base, the base having an aperture through which the entering element is adapted to be projected, and the end portions being provided with notches whose opposite sides diverge in a direction away from the base and between which the jaws are disposed for contact therewith whereby the jaws are urged into firmer contact with the entering element as they are compressed axially of said element.

7. A fastener of the class described constructed of a piece of resilient wire that is split lengthwise substantially midway of its ends, the parts on opposite sides of the split being spread apart to provide jaws between which an entering element is adapted to be projected, the portions of the wire beyond the ends of the jaws extending in the same direction from the plane of the jaws and thence laterally in a plane substantially parallel to that of the jaws to form a base, each terminal portion of the piece of wire being extended toward the jaws and bifurcated and shaped to provide a pair of diverging branches that constitute cam means wherewith the jaws contact and by which they are urged into firmer engagement with the entering element as the jaws are compressed axially of said element.

8. A fastener comprising, in combination, opposed elongate resilient holding parts between which an entering element is adapted to be projected and which, by their inherent resiliency, are caused to grasp the entering element, and means acting upon said holding parts for positively urging them into firmer contact with the entering element as said holding parts are compressed axially of said element.

9. A fastener comprising, in combination, opposed elongate resilient holding parts between which is adapted to be projected an entering element and with which element said holding parts yieldingly engage by reason of their inherent resiliency, and cam means including a base and opposed cam faces that converge toward the base and between which the aforesaid holding parts are disposed and wherewith they contact so that said holding parts are positively urged into firmer engagement with the entering element as said parts are compressed axially of the element toward said base.

10. A gang fastener comprising a base member provided with a plurality of apertures, resilient wire means arranged upon the base member and attached thereto in regions spaced in opposite directions from each aperture, portions of said means intermediate said regions constituting jaws that are disposed on opposite sides of the axis of the apertures and in spaced relation to the base member, and cam means sustained by the base member and including cam faces that diverge in a direction away from the base member and between which the jaws are situated for engagement with said faces as they are moved toward the base member, said wire means being so formed intermediate adjacent pairs of jaws that the portions constituting said jaws are capable of movement relative to the base member in the direction of their length.

JOHN W. SIMMONS.